(12) United States Patent
Isono

(10) Patent No.: US 7,345,520 B2
(45) Date of Patent: Mar. 18, 2008

(54) DELAY CONTROL IN SEMICONDUCTOR DEVICE

(75) Inventor: Takanori Isono, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 269 days.

(21) Appl. No.: 11/153,499

(22) Filed: Jun. 16, 2005

(65) Prior Publication Data

US 2005/0283632 A1    Dec. 22, 2005

(30) Foreign Application Priority Data

Jun. 18, 2004    (JP) ............................ P2004-180644

(51) Int. Cl.
    *H03H 11/26*    (2006.01)
(52) U.S. Cl. .................. 327/276; 327/261; 327/202
(58) Field of Classification Search ................ 327/149, 327/158, 261, 270, 263, 276, 202
    See application file for complete search history.

(56) References Cited

U.S. PATENT DOCUMENTS 6,336,205 B1    1/2002    Kurokawa et al.
6,341,363 B1 *  1/2002    Hasegawa ....................... 716/6
6,535,038 B2    3/2003    Hofstra
7,183,829 B2 *  2/2007    Kuroda et al. ............... 327/261

FOREIGN PATENT DOCUMENTS

JP    2002-228719 A    8/2002

* cited by examiner

*Primary Examiner*—Dinh T. Le
(74) *Attorney, Agent, or Firm*—McDermott Will & Emery LLP

(57) ABSTRACT

In a circuit in which a signal arrival time with respect to a register is different in accordance with the change of a delay time of the circuit, a mechanism capable of adjusting a clock signal of the register is previously provided to deal with the case in which a set-up time in the register is not satisfied due to an increase of the delay time, and the delay time of the clock signal is changed in response to the change of the delay time of the circuit in respective modes. Thereby, the set-up time of data in the register can be satisfied, and an operation frequency of the circuit can be prevented from lowering.

15 Claims, 8 Drawing Sheets

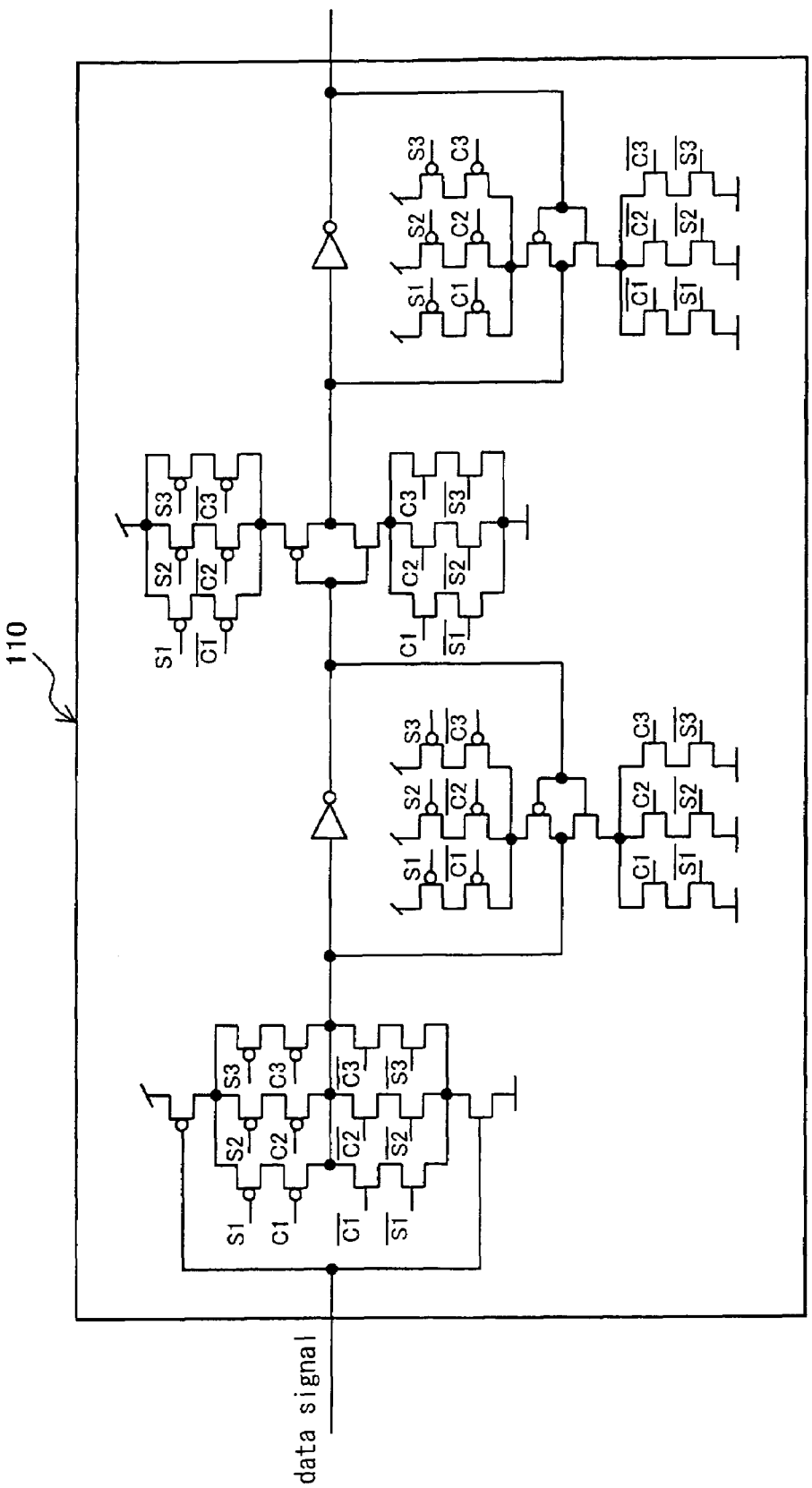
F I G. 2

F I G. 4
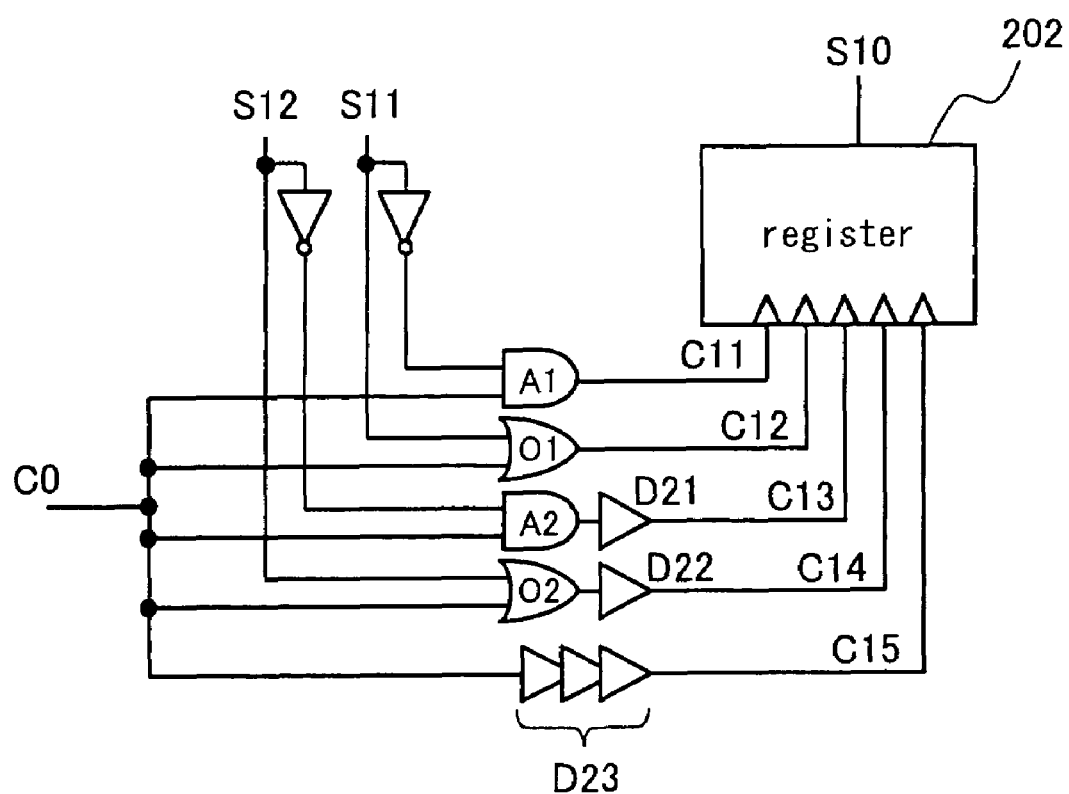

F I G. 6
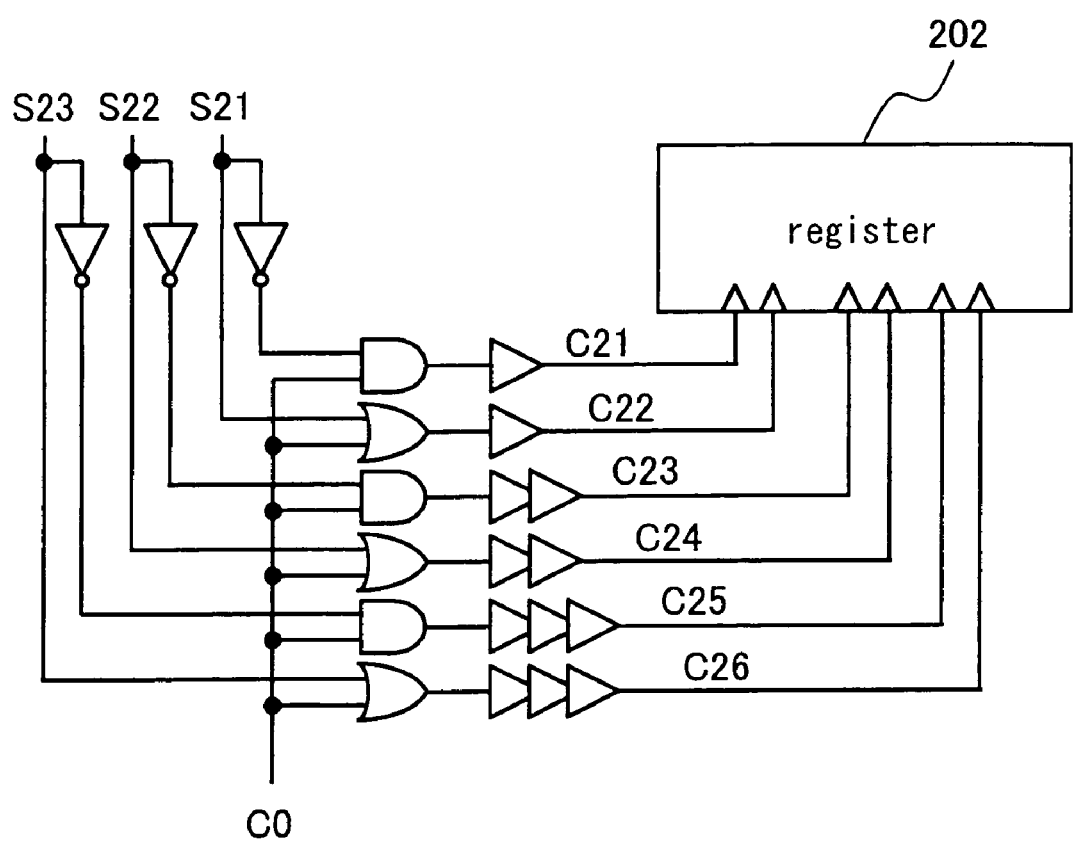

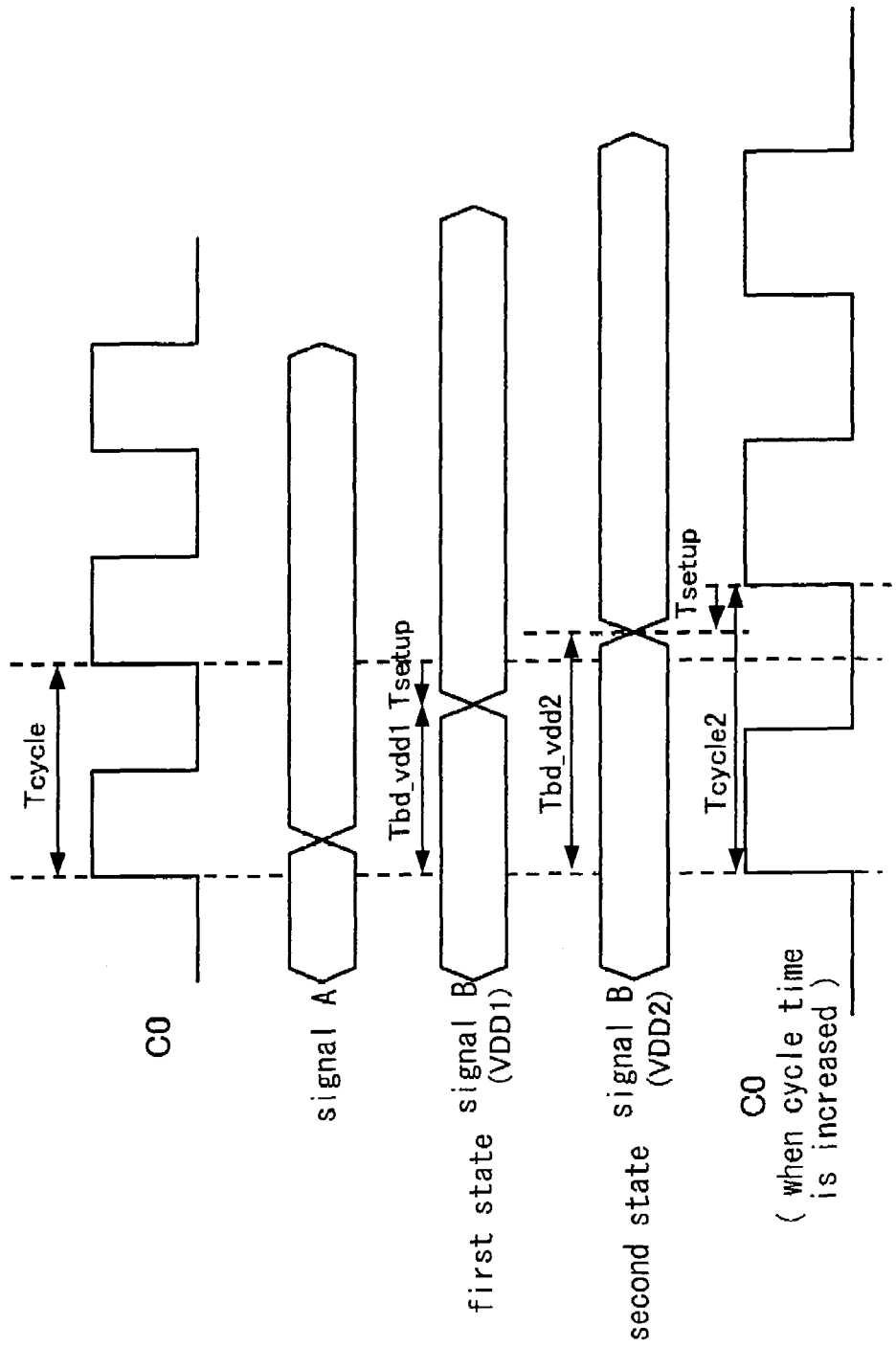

DELAY CONTROL IN SEMICONDUCTOR DEVICE

FIELD OF THE INVENTION

The present invention relates to a semiconductor device, more particularly to a technology for controlling a clock delay in order to deal with a variable circuit delay in the manufactured semiconductor device.

DESCRIPTION OF THE RELATED ART

In recent years, a technology for attaining a higher speed and lower power consumption in LSI is increasingly realized in a semiconductor device. In a circuit dynamically reconfigurable after the manufacturing of the LSI and a circuit in which technologies for controlling a power-supply voltage and a substrate potential are partly employed, a delay time of an inter-register combinational logic changes depending on an application, mode changes and the like. Then, the inter-register delay time results in a variation, as a result of which an operation frequency is determined based on a path in which a largest delay time is generated (rate controlling), and therefore, cannot be increased. Below are mentioned solutions to solve the problem.
1) A synchronous design is generally employed in a clock design, in which case a clock delay value is adjusted to be substantially equal to clock inputs of respective registers in order to facilitate a timing design.
2) A plurality of registers generate differences in a data delay, in response to which a phase of a clock signal to be inputted to each of the registers respectively is arranged to be different so that a set-up time and a hold time in each of the registers can be satisfied. As a result, the operation frequency can be increased.
3) The clock signals are switched over between a scan mode and a normal operation mode (for example, see No. 2002-228719 of the Publication of the Unexamined Japanese Patent Applications) Assuming that the phase of the clock signal to be inputted to a first register and the phase of the clock signal to be inputted to a second register are different in the normal operation mode, it is necessary to equalize the phases of the clock signals to be inputted to the first and second registers. In order to satisfy the demand, a selector circuit for selecting the clock signal having the phase necessary for the normal operation mode and the clock signal having the phase necessary for the scan mode is provided. Thereby, the set-up time and the hold time in the register are satisfied in either of the normal operation mode and the scan mode.

In the clock design, the clocks can be adjusted between the normal operation mode and the scan mode, however, the clock adjustment is not possible in the normal operation mode in the case when the substrate potential and power-supply voltages are further changed after the manufacturing of the LSI and the circuit is dynamically reconfigured. To be specific, the delay of the clock signal takes a fixed value though the data delay changes, which makes the clock adjustment impossible.

An example of the foregoing situation is described referring to FIGS. 7 and 8.

A register 306 is connected to a subsequent stage of a register 302 via a delay stationary circuit 304, and a register 310 is connected to a subsequent stage of the register 306 via a delay change circuit 308. Further, a register 314 is connected to a subsequent stage of the register 310 via a delay stationary circuit 312. In the delay stationary circuits 304 and 312, the delay time does not change after a semiconductor device is manufactured. In the delay change circuit 308, on the contrary, the delay time changes when a power-supply voltage to be supplied to a transistor is changed.

The register 306 outputs a data signal A to the delay change circuit 308, and the register 310 receives a data signal B from the delay change circuit 308. A clock signal C0 is inputted to the registers 302, 306, 310 and 314.

In a first state shown in FIG. 8, a power-supply voltage of the delay change circuit 308 takes a value of VDD1. Focusing on the data signal A outputted from the register 306, the data signal A, which has transmitted through the delay change circuit 308, results in the data signal B. As shown in FIG. 8, referring to a total of a delay time Tbd_vdd1 of the data signal B and a set-up time Tsetup of the register 310, the total time (Tbd_vdd1+Tsetup) stays within a cycle time Tcycle of the clock signal C0. As a result, the set-up time is satisfied in the register 310.

In a second state, it is assumed that the power-supply voltage of the delay change circuit 308 takes a value VDD2 which is lower than VDD1. A delay time Tbd_vdd2 of the data signal B having transmitted through the delay change circuit 308 increases. However, a delay time of the clock signal C0 shows a same value in the first and second states. When the delay time of the data signal B increases from Tvd_vdd1 to Tbd_vdd2, a total of the delay time Tbd_vdd2 and the set-up time Tsetup goes beyond the cycle time Tcycle, as a result of which a correct logic cannot be retained in the register 310.

In order to retain the correct logic, the cycle time Tcycle of the clock signal C0 is increased (Tcycle2). Then, the total time of Tbd_vdd2 and the set-up time Tsetup can stay within the Tcycle2 when.

In the method of selecting the clock signal in the normal operation mode and the clock signal in the scan mode using the selector circuit, a gate delay generated in a stage of the selector has to be taken into account. In the presence of any variation in a manufacturing process, an inconvenience may be generated due to the increased delay time of the clock signal resulting from the gate delay. To describe he inconvenience, the delay time of the clock signal is multiplied by a delay amount which is increased by the generated variation at a certain rate, as a result of which the delay variation of the clock signal is disadvantageously increased as the delay time of the clock signal is increased.

Further, it is necessary to constantly drive a clock signal irrelevant to the operation in connection with the switchover between the clock signal in the normal operation mode and the clock signal in the scan mode, which unfavorably increases the power consumption.

In the case of the method shown in FIGS. 7 and 8, the cycle time of the clock signal is increased, which lowers the operation frequency and consequently degrades a processing performance of the semiconductor device.

SUMMARY OF THE INVENTION

Therefore, a main object of the present invention is to simultaneously adjust a phase of a clock signal when a circuit delay changes due to power supply control, substrate control, dynamic reconfiguration of a circuit and the like, and further, to prevent an operation frequency from decreasing by adjusting the phase of the clock signal.

Another object of the present invention is to change a phase of a clock signal without providing a switching gate such as a selector in a clock line and to form a clock line which is not affected by a variation generated in a manufacturing process by controlling an absolute delay in the clock line to a minimum.

Still another object of the present invention is to form a clock line consuming less power by fixing a logic of an unused clock signal in a plurality of clock signals.

In order to attain the foregoing objects, the present invention implements the following steps.

1) A semiconductor device according to the present invention basically has at least two modes other than a scan mode and comprises at least a circuit, wherein a data signal transmission time from a first register to a second register in a first state and a data signal transmission time from the first register to the second register in a second state are different in the circuit. In the basic constitution, the phase of the clock signal to be inputted to the first register is adjusted based on a control signal for the switchover between the two states. The semiconductor device is characterized in that the first register in a previous stage adjusts the phase of the clock signal and inputs the clock signal.

In the semiconductor device according to the present invention premised on the basic constitution, the phase of the clock signal to be inputted to the second register is adjusted based on the control signal for the switchover between the states. The semiconductor device is characterized in that the second register in a subsequent stage adjusts the phase of the clock signal and inputs the clock signal.

According to the foregoing constitution, the operation frequency can be prevented from decreasing in the respective states through the adjustment of the phase of the clock signal.

2) In a semiconductor device according to the present invention premised on the basic constitution, the first register comprises a plurality of clock signals respectively having different phases as inputs thereof, and a clock signal is selected from the plurality of clock signals based on the control signal for the switchover between the states and used. The semiconductor device is characterized in that the first register in the previous stage selects and inputs one of the plurality of clock signals respectively having the different phases.

In the semiconductor device according to the present invention premised on the basic constitution, the second register comprises a plurality of clock signals respectively having different phases as inputs thereof, and a clock signal is selected from the plurality of clock signals based on the control signal for the switchover between the states and used. The semiconductor device is characterized in that the second register in the subsequent stage selects and inputs one of the plurality of clock signals respectively having the different phases.

According to the foregoing constitution, the operation frequency can be prevented from decreasing in the respective states through the adjustment of the phase of the clock signal as in the foregoing example.

3) In the semiconductor device recited in 2), the first register or the second register preferably further comprises a first group of transistors in which the plurality of clock signals, an input data signal and the control signal are connected to respective gate inputs and source—drain paths are alternately connected and a second group of transistors in which the plurality of clock signals, an internal data signal and the control signal are connected to respective gate inputs and source—drain paths are alternately connected.

According to the foregoing constitution, the delay time in the clock line is prevented from any increase, and the clock line which is not affected by the variation in the manufacturing process can be formed because the delay element such as the selector is not interposed into the clock line inside the first register or the second register.

4) In the semiconductor device according to the present invention premised on the basic constitution, the first register or the second register comprises a plurality of clock signals respectively having different phases as inputs thereof, and a clock signal is selected from the plurality of clock signals based on the control signal for the switchover between the states and used, and a logic of the non-selected clock signal is fixed.

According to the foregoing constitution, the operation frequency can be prevented from decreasing in the respective states through the adjustment of the phase of the clock signal, and the logic of the non-selected clock signal is fixed so that any excessive power consumption can be controlled.

5) The semiconductor device recited in 4) may be effectively adapted in such manner that all or a part of the plurality of clock signals are a plurality of pairs of clock signals, the two signals constituting each pair having a substantially equal phase and the plurality of pairs of signals each having a different phase.

Further, a signal is selected from the plurality of clock signals based on the control signal for the switchover between the states and used, and the logics of the clock signals constituting the non-selected pair are fixed.

According to the foregoing constitution, any excessive power consumption can be controlled because the logics of the clock signals constituting the non-selected pair of signals are fixed.

6) In the semiconductor device recited in 5), the first register or the second register preferably further comprises a first group of transistors in which at least a clock signal constituting the plurality of pairs of signals and the input data signal are respectively connected to gate inputs thereof and source—drain paths are alternately connected and a second group of transistors in which at least a clock signal constituting the plurality of pairs of signals and the internal data signal are respectively connected to gate inputs thereof and source—drain paths are alternately connected.

According to the foregoing constitution, in the first register or the second register, the increase of the delay in the clock line is controlled, and the clock line which is not affected by the variation generated in the manufacturing process can be formed. Further, the increase of the delay in the clock line is controlled and the clock line which is not affected by the variation generated in the manufacturing process can be formed because the delay element such as the selector is not interposed in the clock line.

7) In the semiconductor device according to the present invention premised on the basic constitution, the first register or the second register comprises a singular or a plurality of independent clock signals respectively having different phases, and further, a plurality of pairs of clock signals as inputs thereof, the two signals constituting each pair having a substantially equal phase and the plurality of pairs of signals each having a different phase. Then, one of the clock signal and the pair of signals is selected based on the control signal for the switchover between the states and used, and the logics of the clock signals constituting the non-selected pair are fixed.

According to the foregoing constitution, in compliance with mode occupying ratios of the respective modes (states) in the system, the clock signals operating in the mode of the relatively low occupying ratio constitutes the pair of signals, while the clock signal operating in the mode of the relatively high mode occupying ratio is directly used as the clock signal for the register. As a result, the power consumption can be effectively controlled, and further, an area efficiency can be improved.

8) In the respective semiconductor devices, a difference generated between the first state and the second state typically results from a difference in the power-supply voltages, a difference in the substrate potentials or a difference in the circuit configurations. In the case of the difference in the circuit configuration, the first state and the second state are generated based on a switchover signal for changing the circuit configuration.

BRIEF DESCRIPTION OF THE DRAWINGS

The present invention is illustrated be way of example and not limitation in the figures of the accompanying drawings, in which like references indicate similar elements in which

FIG. 2 is a circuit diagram illustrating a specific internal constitution of a multi-clock input register in the semiconductor device according to the first preferred embodiment;

FIG. 4 is a block diagram illustrating a specific internal constitution of a clock control circuit in the semiconductor device according to the second preferred embodiment;

FIG. 6 is a circuit diagram illustrating a specific internal constitution of a multi-clock input register in a semiconductor device according to a modified example of the second preferred embodiment;

FIG. 8 is a timing chart of an operation of the semiconductor device according to the conventional technology.

DETAILED DESCRIPTION OF PREFERRED EMBODIMENTS

Figure 1:
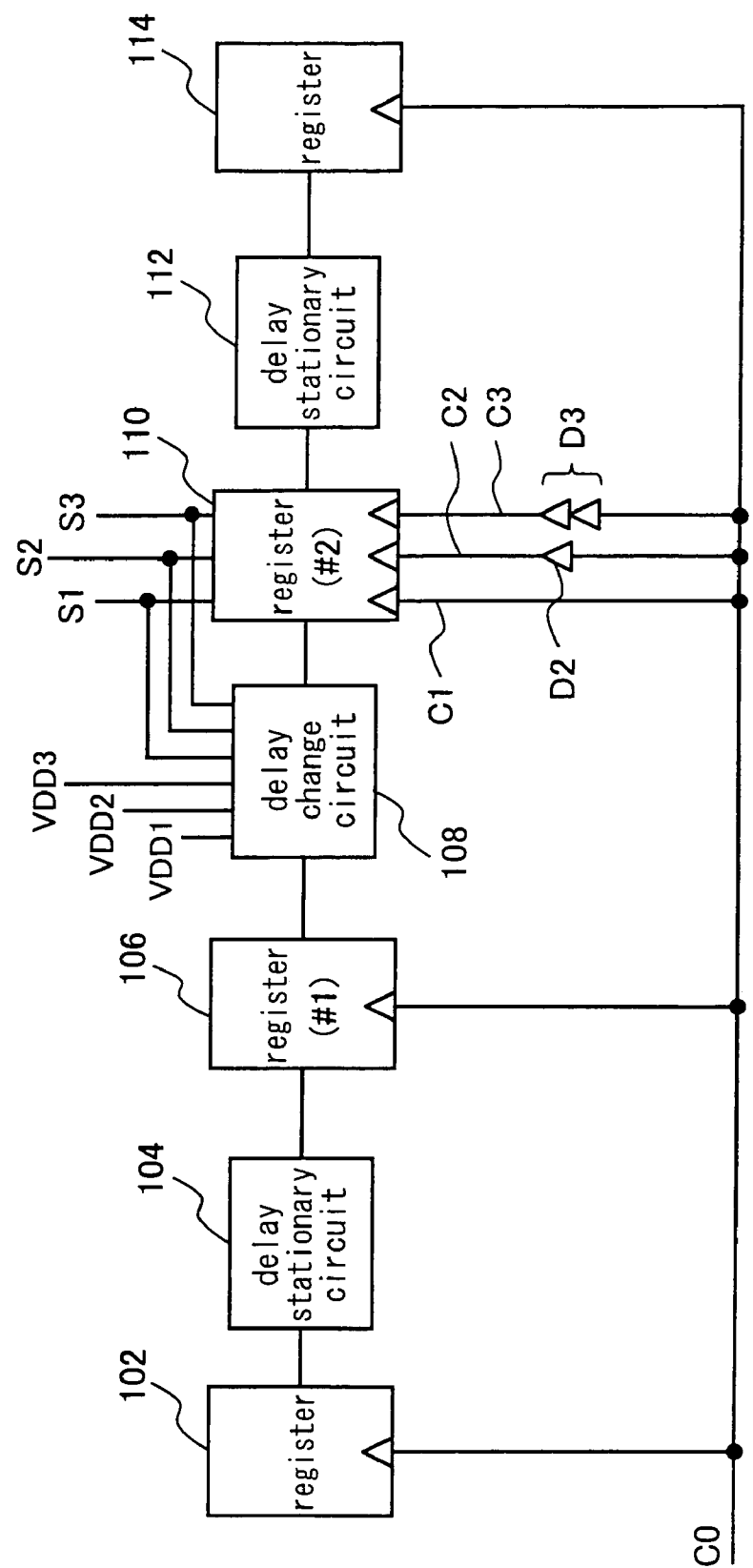
FIG. 1 is a block diagram illustrating a constitution of a semiconductor device according to a first preferred embodiment of the present invention.

Hereinafter, preferred embodiments of the present invention are described referring to the drawings.

First Preferred Embodiment

FIG. 1 is a block diagram illustrating a constitution of a semiconductor device according to a first preferred embodiment of the present invention.

A register 106 is connected to a subsequent stage of a register 102 via a delay stationary circuit 104. A multi-clock input register 110 is connected to a subsequent stage of the register 106 via a delay change circuit 108. Further, a register 114 is connected to a subsequent stage of the register 110 via a delay stationary circuit 112. The delay stationary circuits 104 and 112 do not undergo any change in terms of a circuit delay time after the semiconductor device is manufactured. In the delay change circuit 108, on the contrary, the circuit delay time changes when a power-supply voltage supplied to a transistor is changed.

In the present embodiment, the register 110 disposed in the subsequent stage of the delay change circuit 108 serves as a register for clock control though the register 106 disposed in the previous stage of the delay change circuit 108 may serve as the register for clock control. Hereinafter, the register 106 in the previous stage is referred to as a first register 106, and the register 110 in the subsequent stage is referred to as a second register 110. The present embodiment wherein the second register 110 constitutes the register for clock control corresponds to Claims 2 and 4.

The first register 106 outputs a data signal to the delay change circuit 108, and the second register 110 receives the data signal from the delay change circuit 108. A plurality of clock signals C1 through C3 respectively having different phases and control signals S1 through S3 for controlling the change of a power-supply voltage of the delay change circuit 108 are inputted to the second register 110.

When the control signal S1 is at an active "L" level and the control signals S2 and S3 are both at an inactive "H" level, it is stated as a first state.

When the control signal S2 is at the "L" level and the control signals S1 and S3 are both at the "H" level, it is stated as a second state.

When the control signal S3 is at the "L" level and the control signals S1 and S2 are both at the "H" level, it is stated as a third state.

Next, an operation of the semiconductor device according to the present embodiment constituted as described is described below.

In the first state in which the control signal S1="L" and the control signal S2=S3="H", a power-supply voltage VDD1 is supplied to the delay change circuit 108, and the clock signal C1 serves as a clock signal for operating the second register 110. In this case, the data signal outputted from the first register 106 satisfies a set-up time in the second register 110.

FIG. 2 is a circuit diagram illustrating a specific internal constitution of the multi-clock input second register 110 in the semiconductor device according to the first preferred embodiment.

A transistor whose gate input is the clock signal C1 and a transistor whose gate input is the control signal S1 are source-drain connected.

In the same manner, a transistor whose gate input is the clock signal C2 and a transistor whose gate input is the control signal S2 are source-drain connected.

In the same manner, a transistor whose gate input is the clock signal C3 and a transistor whose gate input is the control signal S3 are source-drain connected. Any of the three control signals S1 through S3 is set at the "L" level.

In the foregoing manner, the second register 110 is adapted to operate based on the clock signal corresponding to the any of the control signals S1 through S3 set at the "L" level.

More specifically, the clock signal inputted to the gate of the transistor, which is source-drain connected to the transistor whose gate input is the control signal S1, is the clock signal C1. The second register 110 is operated based on the clock signal C1 when the control signal S1 is at the level "L".

The clock signal inputted to the gate of the transistor, which is source-drain connected to the transistor whose gate input is the control signal S2, is the clock signal C2. The second register 110 is operated based on the clock signal C2 when the control signal S2 is at the level "L".

The clock signal inputted to the gate of the transistor, which is source-drain connected to the transistor whose gate input is the control signal S3, is the clock signal C3. The second register 110 is operated based on the clock signal C3 when the control signal S3 is at the level "L".

In the present embodiment, an element such as a selector is not used in a clock line as in a conventional technology. Therefore, the number of the gate stages in the clock line can be reduced. As a result, a delay value of the clock signal can be lessened, and the clock line, which is not affected by a variation in a manufacturing process, can be formed.

Next, in the second state in which the control signal S2="L" and the control signal S3=S1="H", a power-supply voltage VDD2 lower than the power-supply voltage VDD1 (<VDD1) is supplied to the delay change circuit 108, and a delay value of the delay change circuit 108 becomes larger than in the first state. In this case, the clock signal C2 serves as the clock signal for operating the second register 110. The clock signal C2 results from delaying a phase of a basic clock signal C0 by a delay element D2. As a result, the set-up time of the data signal in the second register 110 can be satisfied, and an operation frequency can be prevented from decreasing.

Next, in the third state in which the control signal S3="L" and the control signal S1=S2="H", a power-supply voltage VDD3 lower than the power-supply voltage VDD2 (<VDD2) is supplied to the delay change circuit 108, and the delay value of the delay change circuit 108 becomes larger than in the second state. In this case, the clock signal C3 serves as the clock signal for operating the second register 110. The clock signal C3 results from delaying the phase of the basic clock signal C0 by a delay element D3. A delay value of the delay element D3 is larger than a delay value of the delay element D2. As a result, the set-up time of the data signal in the second register 110 can be satisfied, and the operation frequency can be prevented from decreasing.

The first preferred embodiment of the present invention was so far described. Further, the present invention can be implemented according to the following modes.

1) In the foregoing description, the sources and the drains of the transistors whose gate inputs are respectively the clock signal and the control signal are connected inside the second register 110. As an alternative constitution, the element such as the selector may be interposed in the lock line so as to select from the clock signals of the different delay values based on the control signals S1 through S3. Thereby, in the transition from the first state through the third state, the set-up time of the data signal in the second register 110 can be satisfied, and the operation frequency can be prevented from decreasing as in the foregoing example.

2) In the foregoing description, the register 110 for receiving the data signal of the delay change circuit 108 is described as the clock control register. However, the register 106 for outputting the data signal to the delay change circuit 108 can serve as the clock control register based on the same principle. More specifically, the plurality of clock signals respectively having the different phases and the control signals serving as the signal for controlling the change of the power-supply voltage of the delay change circuit 108 may be inputted to the register 106. When the power-supply voltage of the delay change circuit 108 is changed, the clock signal for operating the register 106 is switched based on the control signal. Thereby, the set-up time in the second register 110 can be satisfied with respect to the data signal from the register 106 having transmitted through the delay change circuit 108.

3) In the foregoing description, the set-up time of the data signal is described. Alternatively, the same principle can be applied to the hold time of the data signal. More specifically, the hold time can be satisfied with respect to the change of the delay time of the data signal generated by the change of the power-supply voltage of the delay change circuit 108.

4) The foregoing description is based on the change of the power-supply voltage of the delay change circuit 108. Alternatively, the present invention can be applied to the case in which a delay value of a signal path in the delay change circuit 108 is changed by substrate control, and further to the case in which the delay value of the data signal is changed as a result of reconfiguring the delay change circuit 108. More specifically, the operation frequency can be prevented from decreasing when the same register configuration and the clock line configuration are adopted.

5) In the foregoing description, the three states are described, however, a similar effect can be obtained when the number of the states may be two or equal to or more than four.

Second Preferred Embodiment

Figure 3:
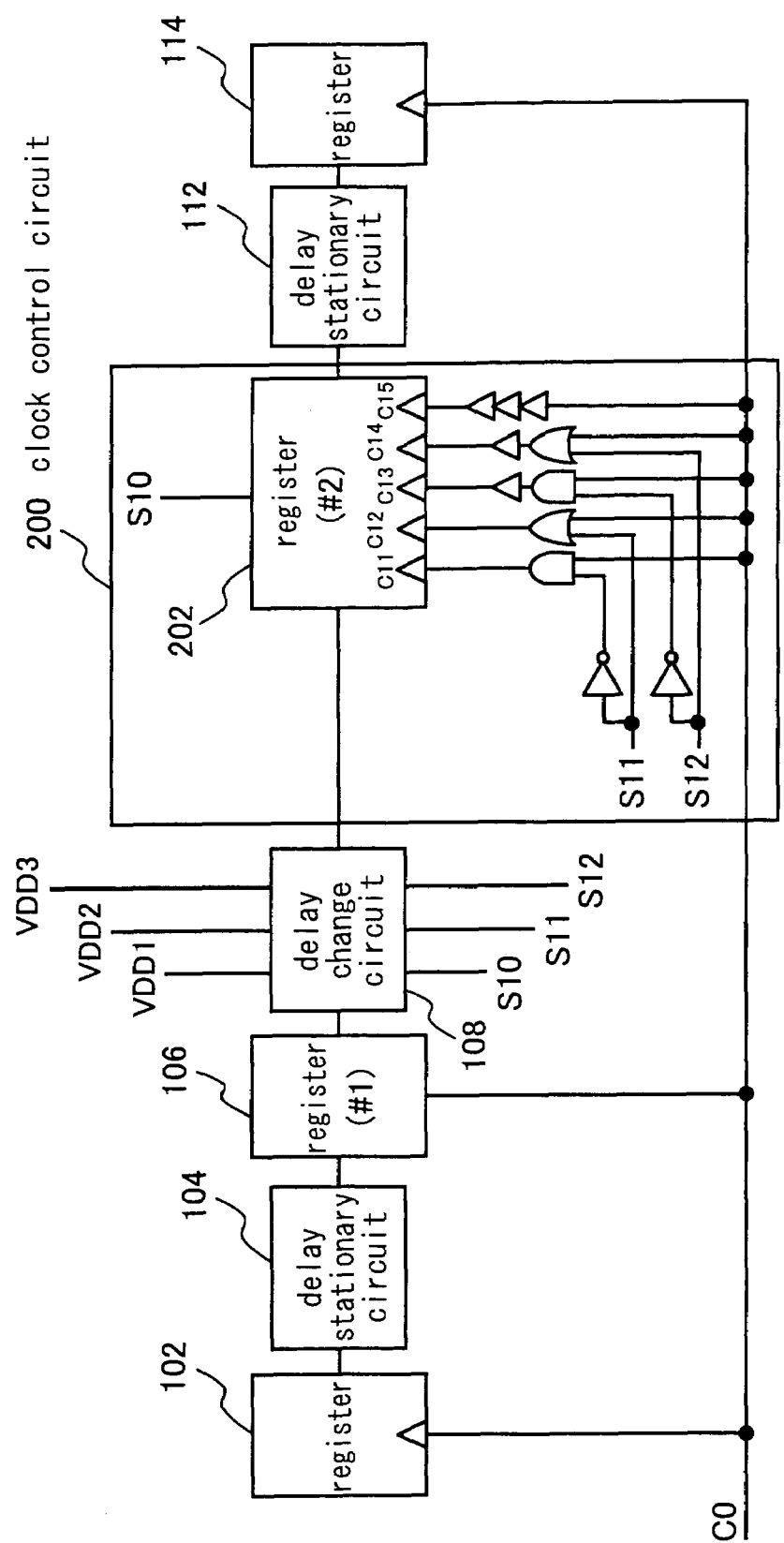
FIG. 3 is a block diagram illustrating a constitution of a semiconductor device according to a second preferred embodiment of the present invention.

FIG. 3 is a block diagram illustrating a constitution of a semiconductor device according to a second preferred embodiment of the present invention. In the block diagram, a clock control circuit 200 is interposed between the delay change circuit 108 and the delay stationary circuit 112 in place of the second register 110 according to the first preferred embodiment. FIG. 4 is a block diagram illustrating a specific internal constitution of the clock control circuit 200 in the semiconductor device according to the second preferred embodiment.

A first pair of a clock signal C11 and a clock signal C12 having a same phase, a second pair of a clock signal C13 and a clock signal C14 having a same phase, and a clock signal C15 are inputted to a multi-clock input second register 202. Further, a control signal S10 for controlling the change of the power-supply voltage of the delay change circuit 108 is inputted to the second register 202.

The basic clock signal C0 and an inversion signal of a control signal S11 as a signal for controlling the change of the power-supply voltage of the delay change circuit 108 are inputted to an AND circuit A1, and an output of the AND circuit A1 is the clock signal C11.

Further, the basic clock signal C0 and a non-inversion signal of the control signal S11 are inputted to an OR circuit O1, and an output of the OR circuit O1 is the clock signal C12. Thus, the phases of the clock signal C11 and the clock signal C12 constituting the first pair are equal to each other.

Further, the basic clock signal C0 and an inversion signal of a control signal S12 as another signal for controlling the change of the power-supply voltage of the delay change circuit 108 are inputted to an AND circuit A2, and an output of the AND circuit A2 is the clock signal C13 via a delay element D21.

Further, the basic clock signal C0 and a non-inversion signal of the control signal S12 are inputted to an OR circuit O2, and an output of the OR circuit O2 is the clock signal C14 via a delay element D22. A delay value of the delay element D22 is substantially equal to a delay value of the delay element D21. Thus, the phases of the clock signal C13 and the clock signal C14 constituting the second pair are equal to each other.

Further, the basic clock signal C0 is the clock signal C15 via a delay element D23. A delay value of the delay element D23 is larger than the delay values of the delay elements D21 and D22.

When the control signal S10 is at the "H" level, the control signal S11 is at the "L" level, and the control signal S12 is at the "H" level, it is stated as a first state.

When the control signal S10 is at the "H" level, the control signal S12 is at the "L" level and the control signal S11 is at the "H" level, it is stated as a second state.

When the control signal S10 is at the "L" level, and the control signals S11 and S12 are both at the "H" level, it is stated as a third state.

Next, an operation of the semiconductor device according to the present embodiment constituted as described is described below.

In the first state in which the control signal S10="H", the control signal S11="L", and the control signal S12="H", the power-supply voltage VDD1 is supplied to the delay change circuit 108, and the first pair of clock signals C11 and C12 serves as a clock signal for operating the second register 202. In this case, the data signal outputted from the first register 106 satisfies a set-up time in the second register 202.

At that time, because the control signal S12 is at the "H" level, and the "L" level inverted by an inverter is applied to the AND circuit A2, a logic of the clock signal C13 is fixed at the "L" level. Further, a logic of the clock signal C14 is fixed at the "H" level because the "H" level is applied to the OR circuit O2.

Figure 5:
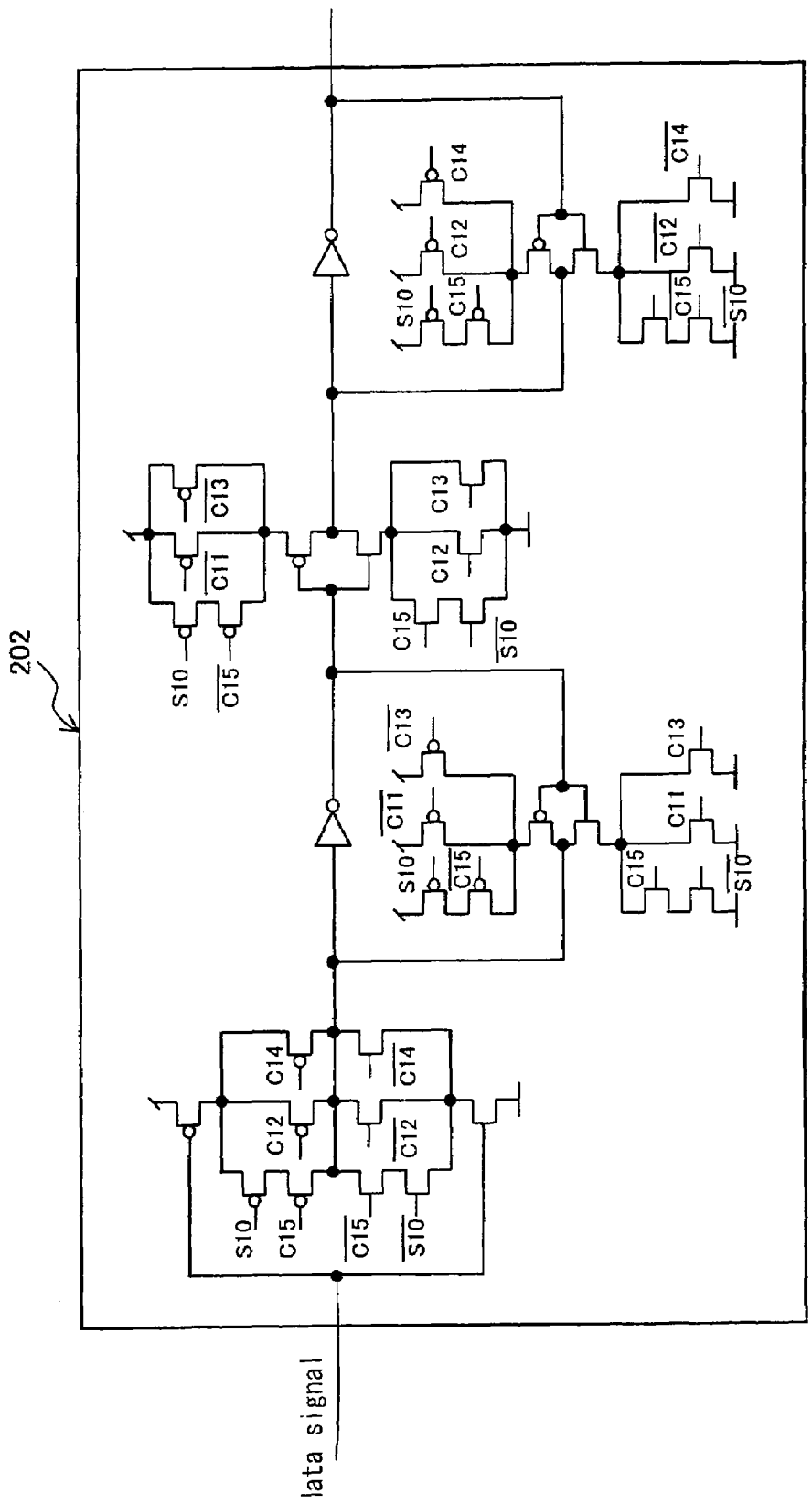
FIG. 5 is a circuit diagram illustrating a specific internal constitution of a multi-clock input register in the semiconductor device according to the second preferred embodiment.
Figure 7:
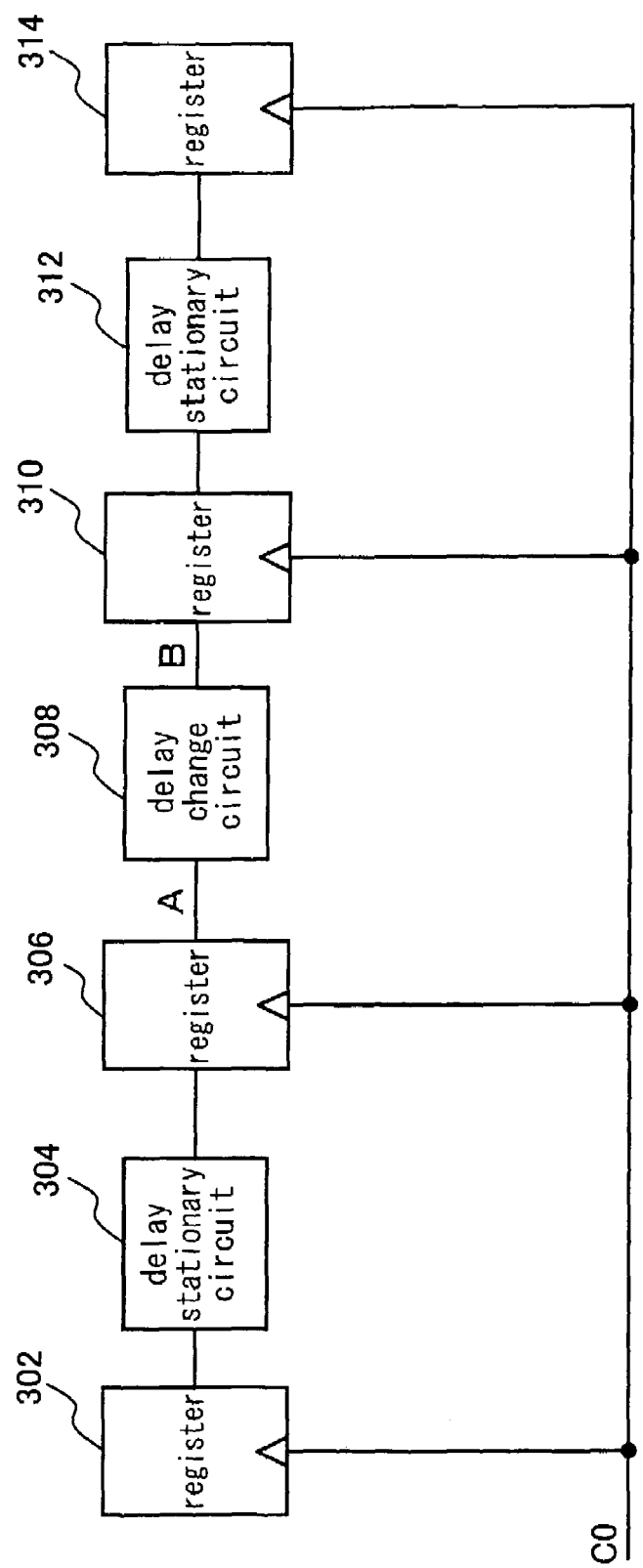
FIG. 7 is a block diagram illustrating a constitution of a semiconductor device according to a conventional technology.

FIG. 5 is a circuit diagram illustrating a specific internal constitution of the multi-clock input register 202 in the semiconductor device according to the second preferred embodiment.

A transistor whose gate input is the clock signal C15 and a transistor whose gate input is the control signal S10 are source-drain connected. When the control signal S10 is at the "H" level, the clock signal C15 is not used for the operation of the second register 202.

In the first state, the control signal S12 is at the "H" level, however, the clock signal S13 is fixed at the "L" level and the clock signal C14 is fixed at the "H" level at that time. In the first state, the first pair of clock signals C11 and C12 is active because the control signal S11 is at the "L" level, and the second register 202 is thereby operated. When the logics of the clock signals C13 and C14 which are not used for the operation of the second register 202 are thus fixed, power consumption in the clocks signals C13 and C14 can be nil.

Next, in the second state in which the control signal S10="H", the control signal S12="L", and the control signal S11="H", the power-supply voltage VDD2 lower than the power-supply voltage VDD1 (<VDD1) is supplied to the delay change circuit 108, and the delay value of the delay change circuit 108 is increased. In this case, in the same manner as in the first state, the second pair of signals C13 and C14 is active, and the second register 202 is thereby operated. The clock signals C13 and C14 result from delaying the phase of the basic clock signal C0 by the delay elements D21 and D22. Therefore, the set-up time of the data signal in the second register 202 can be satisfied, and the operation frequency is prevented from lowering. At that time, the logics of the clock signals C11 and C12, which are not used for the operation of the second register 202, are fixed. Thereby, power consumption in the clocks signals C11 and c12 can be nil Next, in the third state in which the control signal S10="L", and the control signal S11 and S12="H", the power-supply voltage VDD3 lower than the power-supply voltage VDD2 (<VDD2) is supplied to the delay change circuit 108, and the delay value of the delay change circuit 108 becomes larger than in the second state. In this case, the logics of the first pair of signals and the second pair of signals are all fixed because the control signal S11 and the control signal S12 are both at the "H" level. Then, the clock signal C15 serves as the clock signal for operating the second register 202 because the control signal S10 is at the "L" level. The clock signal C15 results from delaying the phase of the basic clock signal C0 by the delay element D23. The delay value of the delay element D23 is larger than the delay values of the delay elements D21 and D22. Therefore, the set-up time of the data signal in the second register 202 can be satisfied, and the operation frequency is prevented from lowering. At that time, the logics of the clock signals C1 through C14, which are not used for the operation of the second register 202, are fixed, and the power consumption in the clock signals C11 through C14 can be thereby nil.

In the foregoing description, the five clock signals are inputted to the second register 202. In the presence of the two pairs of signal each having the same phase, the clock signals of three phases are substantively inserted. The AND circuit and the OR circuit respectively execute the logic fixing in order to reduce the power consumption.

Now, it is to be determined that the clock signal of which phase in the plurality of different clock signals is generated in the AND circuit and the OR circuit. In determining that, it is necessary to use them depending on occupying ratios of the respective states.

The clock signal, whose phase is necessary for the state in which the occupying ratio is at a maximum level, is hypothetically generated in the AND circuit and the OR circuit. When a state different to the state in which the occupying ratio is at the maximum level is activated, the power consumption is reduced as a result of the logic fixing in the AND circuit and the OR circuit, however, a maximum probability cannot be obtained. More specifically, the probability is maximized, not when the different state is activated, but in the state in which the occupying ratio is in the maximum state. In contrast to that, when the state of the maximum occupying ratio is activated, the power is consumed in the AND circuit and the OR circuit. The power consumption is increased because of the maximum probability, which causes an adverse effect on the reduction of the power consumption.

On the contrary to the foregoing hypothesis, the power consumption is more effectively reduced when the clock signal, whose phase is necessary for the state of the low occupying ratio, is generated in the AND circuit and in the OR circuit. Therefore, it is preferable that the clock signal of the maximum occupancy ratio be generated without using the AND circuit and the OR circuit. In the case of FIG. 4, the clock signal of the maximum occupying ratio is preferably transmitted through a line of the delay element D23.

As an example, it is assumed that the probability of the first state is 5%, the probability of the second state is 10%, and the probability of the third state is 85%. It is preferable not to generate the clock signal whose phase is necessary for the third state in which the probability is 85% in the AND circuit and the OR circuit. The clock signal, whose phase is necessary for the first and second states in which the probability is lower than in the third state as 5% and 10%, is preferably generated in the AND circuit and in the OR circuit in terms of the reduction of the power consumption.

When the occupancy ratios of the states are substantially the same, and the power consumptions in the AND circuit and the OR circuit are relatively low, a circuit configuration shown in FIG. 6 is also effective, wherein the logics of all of the clock signals are fixed by the AND circuit and the OR circuit. Thereby, the power consumption can be effectively controlled.

So far, the second preferred embodiment was described. The present invention can be further implemented according to the following modes.

1) In the foregoing description, the second register 202 for receiving the data signal of the delay change circuit 108 is described. However, the first register 106 for outputting the data signal to the delay change circuit 108 can serve as the clock control register based on the same principle. More specifically, it is assumed that a plurality of pairs of signals, the each pair having a same phase, and a singular or a plurality of clock signals are inputted, and a control signal for controlling the change of the power-supply voltage of the delay change circuit 108 is further inputted. When the power-supply voltage of the delay change circuit 108 is changed, the clock signal for operating the first register 106 is selected based on the control signal. Thereby, the set-up time of the data signal from the first register 106 having transmitted through the delay change circuit 108 in the second register 202 can be satisfied.

2) In the foregoing description, the set-up time of the data signal is described. Alternatively, the same principle can be applied to the hold time of the data signal. More specifically, the hold time can be satisfied with respect to the change of the delay time of the data signal generated by the change of the power-supply voltage of the delay change circuit 108.

3) The foregoing description refers to the case in which the power-supply voltage of the delay change circuit 108 is changed. Alternatively, the present invention can be applied to the case in which a delay value of a signal path in the delay change circuit 108 is changed by the substrate control, and further to the case in which the delay value of the data signal is changed as a result of reconfiguring the delay change circuit 108. More specifically, the operation frequency can be prevented from lowering when the same register configuration and the clock line configuration are adopted.

4) In the foregoing description, the three states are described, however, a similar effect can be obtained when the number of the states may be two or equal to or more than four.

5) The AND circuit and the OR circuit as the circuit configuration for the logic fixing may be replaced by alternative circuits.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. A semiconductor device having at least two states other than a scan mode, the at least two states differing in power source potential, substrate potential, or circuit configuration after dynamic reconfiguration, the semiconductor device comprising:
   first and second registers for latching and outputting input data; and
   at least one delay change circuit in a transmission path for transmitting data output from the first register to the second register, the delay change circuit having different transmission times in a first state and in a second state when transmitting a data signal from the first register to the second register, wherein
   the semiconductor device has phase-changing means for changing a phase of a clock signal inputted into the first register based on a control signal for switchover between the states.

2. A semiconductor device having at least two states other than a scan mode, the at least two states differing in power source potential, substrate potential, or circuit configuration after dynamic reconfiguration, the semiconductor device comprising:
   first and second registers for latching and outputting input data; and
   at least one delay change circuit in a transmission path for transmitting data output from the first register to the second register, the delay change circuit having different transmission times in a first state and in a second state when transmitting a data signal from the first register to the second register, wherein
   the semiconductor device has phase-changing means for changing a phase of a clock signal inputted into the second register based on a control signal for switchover between the states.

3. A semiconductor device having at least two states other than a scan mode, the at least two states differing in power source potential, substrate potential, or circuit configuration after dynamic reconfiguration, the semiconductor device comprising:
   first and second registers for latching and outputting input data; and
   at least one delay change circuit in a transmission path for transmitting data output from the first register to the second register, the delay change circuit having different transmission times in a first state and in a second state when transmitting a data signal from the first register to the second register, wherein
   the first register comprises a plurality of clock signals respectively having different phases as inputs thereof, and a clock signal is selected from the plurality of clock signals based on a control signal for switchover between the states and used.

4. A semiconductor device having at least two states other than a scan mode, the at least two states differing in power source potential, substrate potential, or circuit configuration after dynamic reconfiguration, the semiconductor device comprising:
   first and second registers for latching and outputting input data; and
   at least one delay change circuit in a transmission path for transmitting data output from the first register to the second register, the delay change circuit having different transmission times in a first state and in a second state when transmitting a data signal from the first register to the second register, wherein
   the second register comprises a plurality of clock signals respectively having different phases as inputs thereof, and a clock signal is selected from the plurality of clock signals based on a control signal for switchover between the states and used.

5. A semiconductor device as claimed in claim 3, wherein the first register further comprises a first group of transistors in which the plurality of clock signals, an input data signal and the control signal are connected to respective gate inputs and source-drain paths are mutually connected, and a second group of transistors in which the plurality of clock signals, an internal data signal and the control signal are connected to respective gate inputs and source-drain paths are mutually connected.

6. A semiconductor device as claimed in claim 4, wherein the second register further comprises a first group of transistors in which the plurality of clock signals, an input data signal and the control signal are connected to respective gate inputs and source-drain paths are mutually connected, and a second group of transistors in which the plurality of clock signals, an internal data signal and the control signal are connected to respective gate inputs and source-drain paths are mutually connected.

7. A semiconductor device having at least two states other than a scan mode, the at least two states differing in power source potential, substrate potential, or circuit configuration after dynamic reconfiguration, the semiconductor device comprising:

first and second registers for latching and outputting input data; and at least one delay change circuit in a transmission path for transmitting data output from the first register to the second register, the delay change circuit having different transmission times in a first state and in a second state when transmitting a data signal from the first register to the second register, wherein the first register comprises a plurality of clock signals respectively having different phases as inputs thereof, a clock signal is selected from the plurality of clock signals based on a control signal for switchover between the states and used, and a logic of the non-selected clock signal is fixed.

8. A semiconductor device having at least two states other than a scan mode, the at least two states differing in power source potential, substrate potential, or circuit configuration after dynamic reconfiguration, the semiconductor device comprising:

first and second registers for latching and outputting input data; and at least one delay change circuit in a transmission path for transmitting data output from the first register to the second register, the delay change circuit having different transmission times in a first state and in a second state when transmitting a data signal from the first register to the second register, wherein the second register comprises a plurality of clock signals respectively having different phases as inputs thereof, a clock signal is selected from the plurality of clock signals based on a control signal for switchover between the states and used, and a logic of the non-selected clock signal is fixed.

9. A semiconductor device as claimed in claim 7, wherein all or a part of the plurality of clock signals are a plurality of pairs of signals, the two signals constituting each pair having a substantially equal phase, and the plurality of pairs of signals each having a different phase, wherein a clock signal is selected from the plurality of clock signals based on a control signal for switchover between the states and used, and logics of the clock signals constituting the non-selected pair are fixed.

10. A semiconductor device as claimed in claim 8, wherein all or a part of the plurality of clock signals are a plurality of pairs of signals, the two signals constituting each pair having a substantially equal phase, and the plurality of pairs of signals each having a different phase, wherein a clock signal is selected from the plurality of clock signals based on a control signal for switchover between the states and used, and logics of the clock signals constituting the non-selected pair are fixed.

11. A semiconductor device as claimed in claim 9, wherein the first register further comprises a first group of transistors in which at least a clock signal constituting the plurality of pairs of signals and an input data signal are connected to respective gate inputs and source-drain paths are mutually connected, and a second group of transistors in which at least a clock signal constituting the plurality of pairs of signals and an internal data signal are connected to respective gate inputs and source-drain paths are mutually connected.

12. A semiconductor device as claimed in claim 10, wherein the second register further comprises a first group of transistors in which at least a clock signal constituting the plurality of pairs of signals and an input data signal are connected to respective gate inputs and source-drain paths are mutually connected, and a second group of transistors in which at least a clock signal constituting the plurality of pairs of signals and an internal data signal are connected to respective gate inputs and source-drain paths are mutually connected.

13. A semiconductor device having at least two states other than a scan mode, the at least two states differing power source potential, substrate potential, or circuit configuration after dynamic reconfiguration, the semiconductor device comprising:

first and second registers for latching and outputting input data; and at least one delay change circuit in a transmission oath for transmitting data output from the first register to the second register, the delay change circuit having different transmission times in a first state and in a second state when transmitting data signal from the first register to the second register, wherein the first register comprises a singular or a plurality of independent clock signals respectively having different phases, and a plurality of pairs of signals constituting two clock signals of the pair having a substantially equal phase and the plurality of pairs of signals each having a different phase as inputs thereof, and one of the clock signal and the pair of signals is selected based on a control signal for switchover between the states and used, and logics of the clock signals constituting the non-selected pair are fixed.

14. A semiconductor device having at least two states other than a scan mode, the at least two states differing in power source potential, substrate potential, or circuit configuration after dynamic reconfiguration, the semiconductor device comprising:

first and second registers for latching and outputting input data; and at least one delay change circuit in a transmission path for transmitting data output from the first register to the second register, the delay change circuit having different transmission times in a first state and in a second state when transmitting data signal from the first register to the second register, wherein the second register comprises a singular or a plurality of independent clock signals respectively having different phases, and a plurality of pairs of signals constituting two clock signals of the pair having a substantially equal phase and the plurality of pairs of signals each having a different phase as inputs thereof, and one of the clock signal and the pair of signals is selected based on a control signal for switchover between the states and used, and logics of the clock signals constituting the non-selected pair are fixed.

15. The semiconductor device as claimed in claim 1, wherein the first state and the second state are generated based on a switchover signal for changing the circuit configuration.

* * * * *